Feb. 23, 1954 F. H. RAYMOND ET AL 2,670,463
METHOD AND MEANS FOR REMOTE SELECTING MEMBERS
Filed July 13, 1950 4 Sheets-Sheet 1
Fig. 1
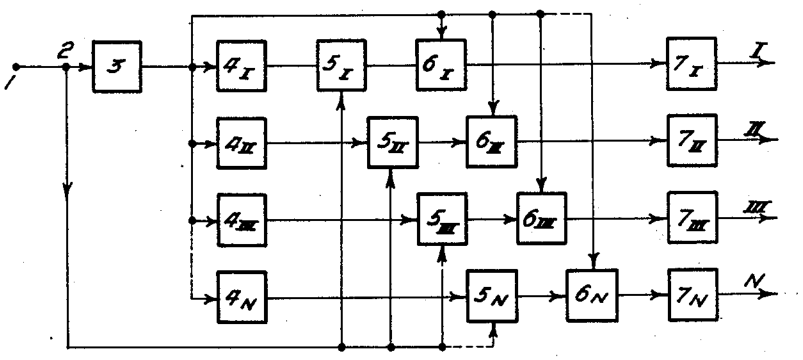
Fig. 2
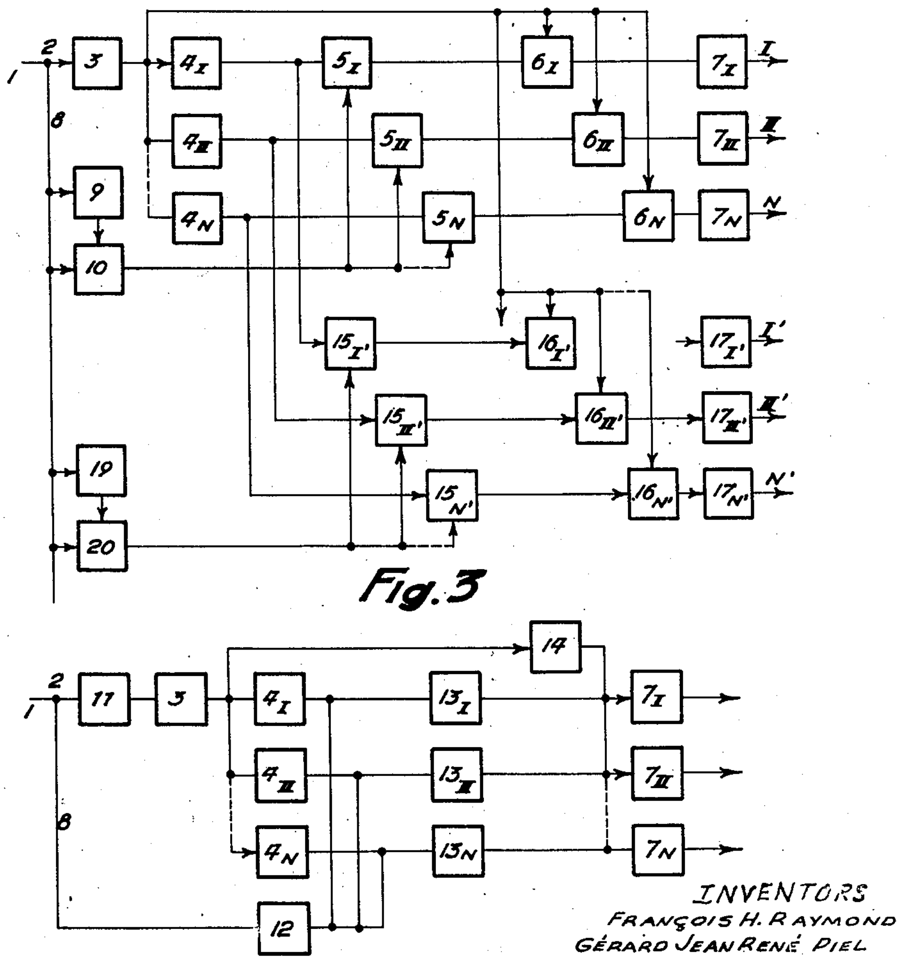
Fig. 3
INVENTORS
FRANÇOIS H. RAYMOND
GÉRARD JEAN RENÉ PIEL
By Ralph B. Stewart
Attorney

METHOD AND MEANS FOR REMOTE SELECTING MEMBERS

Filed July 13, 1950 4 Sheets-Sheet 2

INVENTORS
FRANCOIS H. RAYMOND
GÉRARD JEAN RENÉ PIEL

BY Ralph B. Stewart
ATTORNEY

Feb. 23, 1954 F. H. RAYMOND ET AL 2,670,463

METHOD AND MEANS FOR REMOTE SELECTING MEMBERS

Filed July 13, 1950 4 Sheets-Sheet 3

INVENTORS
FRANCOIS H. RAYMOND
GÉRARD JEAN RENÉ PIEL

BY Ralph B. Stewart
ATTORNEY

FIG. 4.'

INVENTORS
FRANCOIS H. RAYMOND
GÉRARD JEAN RENÉ PIEL
BY Ralph B. Stewart
ATTORNEY Patented Feb. 23, 1954 2,670,463

UNITED STATES PATENT OFFICE 2,670,463

METHOD AND MEANS FOR REMOTE SELECTING MEMBERS

François Henri Raymond, Le Vesinet, and Gérard Jean René Piel, Paris, France, assignors to Societe d'Electronique et d'Automatisme, Paris, France, a corporation of France Application July 13, 1950, Serial No. 173,656

Claims priority, application France July 18, 1949

9 Claims. (Cl. 340—147)

The present invention relates to selective signaling systems for remote control generally and more particularly applicable to remote signaling, communication and control systems in which control signals transmitted from one of the stations in the system should cause selectively, according to the way in which said control signals are formed, certain predetermined actions in another station of the system. The meaning of control signals as used herein is that of any signal the function of which is to modify the condition of a member or circuit, whether such a modification itself constitutes the directly sought result in the system, such as control and/or indication and/or adjustment of the condition of an equipment, or whether an accessory result, such as preparing a control and/or an indication and/or an adjustment, establishing and/or supervising and/or controlling a connection, etc.

The present invention has for its object to provide remote selecting equipments using, for the carrying out of the transmitted controls or orders, component parts which are identical to one another and which require no switching and preferably comprising no local source of power supply to be set into action.

Another object of the present invention is to provide means permitting the extension of the capacity of the remote selecting equipments thus constituted, said extension requiring but a relatively small number of parts differing from the parts used in the original system.

The remote selection system according to the present invention is essentially characterized in that each control signal, of a distinct character, but of any kind, is not used to act on the member corresponding to such control signal, but is used, at least partially, by its prefix portion on the one hand, to generate a single actuating signal for the whole of the control members and, on the other, to effect the transmission of said actuating signal, thus locally generated, to the one member corresponding to the said control signal, by locally and simultaneously generating all of the control signals and checking the conformity of the input control signal as it stands against one of the locally generated control signals, after which the actuating signal is applied to the proper control member, if such checking gives a suitable result, and remains unoperative on any of the control members, if such checking gives an unsuitable result.

Figure 4:
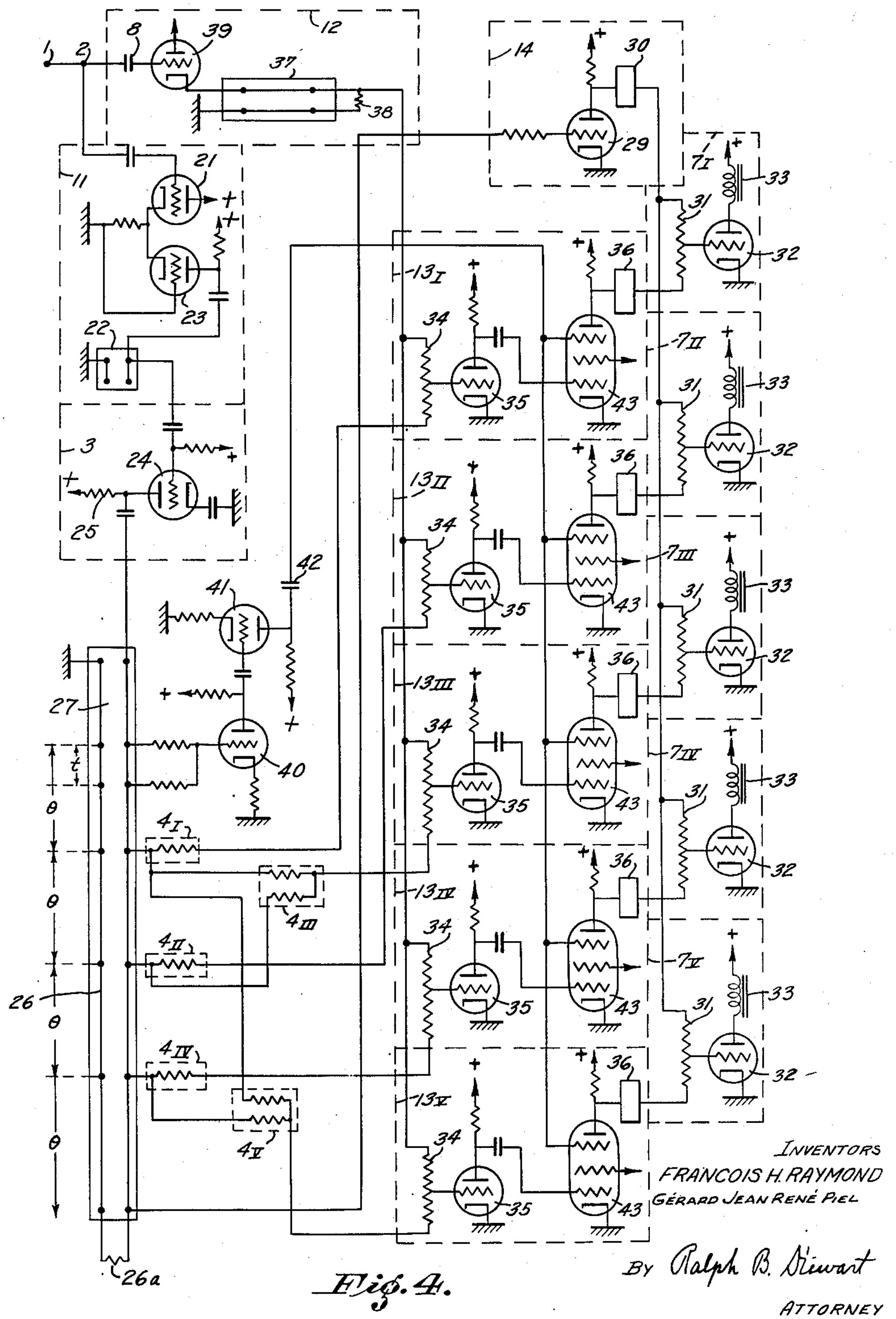

The present invention is now to be explained, first, with reference to the general arrangement of the system as represented in the block diagrams shown in Figs. 1 to 3 of the appended drawings and, secondly, in relation to a particular embodiment shown in detail in Figs. 4, 4′ and 4″ and the operational diagrams of which are shown in Figs. 5*a* to 5*d*.

In the following, the control signals will be considered as being impulse coded signals or PCM signals, since such signals are particularly advantageous in the device of the present invention. The body of such signals represents a numerical code formed of impulses which are distributed in a certain predetermined number of code moments, and each signal is preceded by a pilot signal formed of at least one pilot impulse. In certain preferred embodiments, this pilot signal may also be coded, and will be designated by the word "prefix," each of the latter being characteristic of a particular group of members which are to be selectively actuated; this provides the possibility of effectively reducing the number of numerical codes which are made use of and therefore simplifies a remote control equipment.

Fig. 1 relates to a remote selection equipment intended to actuate a number of control members through channels I, II, III, . . . N, according to control signals appearing at 1. It is assumed that there is but one set of control signals, from I to N, assigned to a set of control members, and each signal of the set must necessarily actuate one of the control members. Any signal appearing at 1 is directed at 2 on to two channels. In the first channel a member 3 first produces one local actuating signal common to all of the control members. This member 3 may consist in means for detecting the presence of the control signal followed by an actuating signal generator—or otherwise, and, assuming that all the control signals assigned to the group of control members comprise a common part or prefix, said member 3 may consist in means to detect said prefix, followed by a circuit deriving from said common prefix one common actuating signal (possibly said prefix itself). The common actuating signal thus generated is applied to the parallel set of circuits or members 4I, 4II, 4III, . . . 4N which, through excitation from this signal, generate distinctive checking signals corresponding to the respective order or control signals assigned to the various control members. Said circuits 4 locally generate control signals when they are excited by said signal derived by member 3 from the incoming order signal, or at least from the prefix of said order signal. Of course, this generation of checking signals may be obtained through one generator with N outputs. An example shall be given with respect to Fig. 4.

Each member 4 is accompanied by a comparator 5, which is itself followed by a gating switch 6, through which the actuating signal generated at 3 and fed in parallel to all these switches 6 must flow to reach the corresponding actuating member or circuit 7. However, this switch is locked as long as, simultaneously with the actuating signal, a voltage from the preceding comparator 5 is applied to said switch. In order that switch 6 be released and thus, that the actuating signal generated under the action of any input control signal may reach the actuating member or circuit 7 corresponding to this particular control, it is thus necessary that the output of the comparator 5 inserted in the channel of the local generator of the corresponding order, alters its output voltage condition to unlock the corresponding switch 6. Each comparator is established, as further explained with respect to Fig. 4, to show two possible conditions of output voltage, a high one and a low one; one of said condiitons can, as known per se, lock a gate, the other unlock said gate. For such purpose, channel 8, derived at 2, feeds the input control signal in parallel on the whole set of comparators 5, so that one only of the outputs of said comparators should correspond to the release characteristic of switch 6; this, as above-mentioned, is provided most advantageously when the output of the comparator is brought to a distinctive value through the identity of the input and local control signals, while all the other comparator outputs maintain locking voltages onto the other switches. In other words, the embodiment generally provided in practice is that which results in the input control signal being applied in opposition to each of the checking signals generated at 4.

Anyway, whatever be the practical embodiment, it appears that the equipment thus constituted must include, in addition to an actuating signal generator and checking signal generators (controlled or regenerated local control signals), a series of members or circuits 5, 6 and 7, identical in each series. Consequently, the control system and the extension of such equipments are particularly advantageous, in regard to the homogeneity of the equipment, i. e. of its cost, while also giving all desirable operating security, inasmuch as an input control signal appearing in a mutilated state would not be fed to the control members.

It is also clear that, if more than one remote selection equipment of this type are distributed along one common transmission channel (viz connected in parallel on such a distribution channel), the various series or groups of control signals shall be automatically selected by said equipments, provided that generators 4 be adapted to locally generate the complete set of control signals assigned to the respective control members. More particularly, if, by reason of the large total capacity of the remote selection, such series or sets of signals are made, as previously described, of two parts: a prefix and a body, the checking signal generators must be adapted to locally generate full signals.

To simplify the practical embodiment of the equipments, while giving the user the possibility of using identical groups of generators 4, from one remote selection equipment to another (or to divide such equipments in secondary groups of the same structure), another modification of the invention requires that generators 4 generate only the bodies of the control signals, and includes means to cause, through previous selection, a routing of the control signals to different groups of control members according to their prefixes. Such a case is diagrammatically illustrated, in one of these forms, in Fig. 2.

For sake of clarity, Fig. 2 only shows the subdividing into two secondary systems or groups of a remote selection equipment according to the invention. Actuating signal generator 3 and control signal generators 4 are again to be found in Fig. 2, but limited to the local regeneration of the bodies of the said control signals. Two sets of comparators 5 and 15, identical to one another, two corresponding sets, 6 and 16, of switches also identical and two sets of actuating circuits or members 7 and 17, are provided in channels I . . . N and I' . . . N' respectively (numbers N and N' may either be equal, or not). The outputs of generators 4 are then connected in parallel to comparators 5 and 15 (if the numbers of the latter are different in each series, certain of generators 4 are to be connected only to certain comparators 5 or 15). Likewise, the same actuating signal is fed to all switches 6 and 16 in all the groups.

In channel 8, for applying the control signals to the comparators, are provided devices for selecting or routing control signals onto one of the series of comparators 5 or 15. For such purpose, prefix analyzing or responsive circuits such as 9 and 19, for example, are connected in parallel to channel 8 and one of these circuits upon responding to the prefix releases a circuit 10 or 20, which transmits the signal body to one of comparators 5 or 15.

As a modification, and when remote selection stations are distributed along a signaling or communication channel, such a routing selection may be provided before generator 3 of the actuating local signal is set in operation. This modification is shown in the input circuit of the diagram of Fig. 3, by the provision of selecting circuit or member 11. However, in Fig. 3 the main modification shown consists in a simplification of the arrangement allowing elimination of switches 6 of the preceding figures. Comparators 5 are substituted by members or circuits to which are applied the results of mixing the input control signal with each of the checking control signals. Members or circuits 13 are such that, for any difference between the control signal and any of the checking signals, each circuit supplies to its control member a voltage which balances or cancels the actuating signal voltage, the actuating voltage being sufficiently delayed at 14 to be applied to all actuating members 7 at the same time that said balancing or cancellation voltages reach these members. Thus a balancing voltage is applied to each control member but one. It is this latter member, receiving only the actuating signal voltage, which operates to carry out the transmitted order.

A particular embodiment of the system shown in Fig. 3 is illustrated in detail in Fig. 4. Fig. 4 provides for five different control channels. To show the relation between Fig. 3 and Fig. 4, various elements in Fig. 4 are enclosed in dotted blocks which are marked by the same reference characters as the corresponding blocks in Fig. 3.

In Figure 4 the connections leading from the anodes of the electron tubes and terminated in arrows lead to the positive side of a suitable anode current supply.

Figures 5A, 5B:
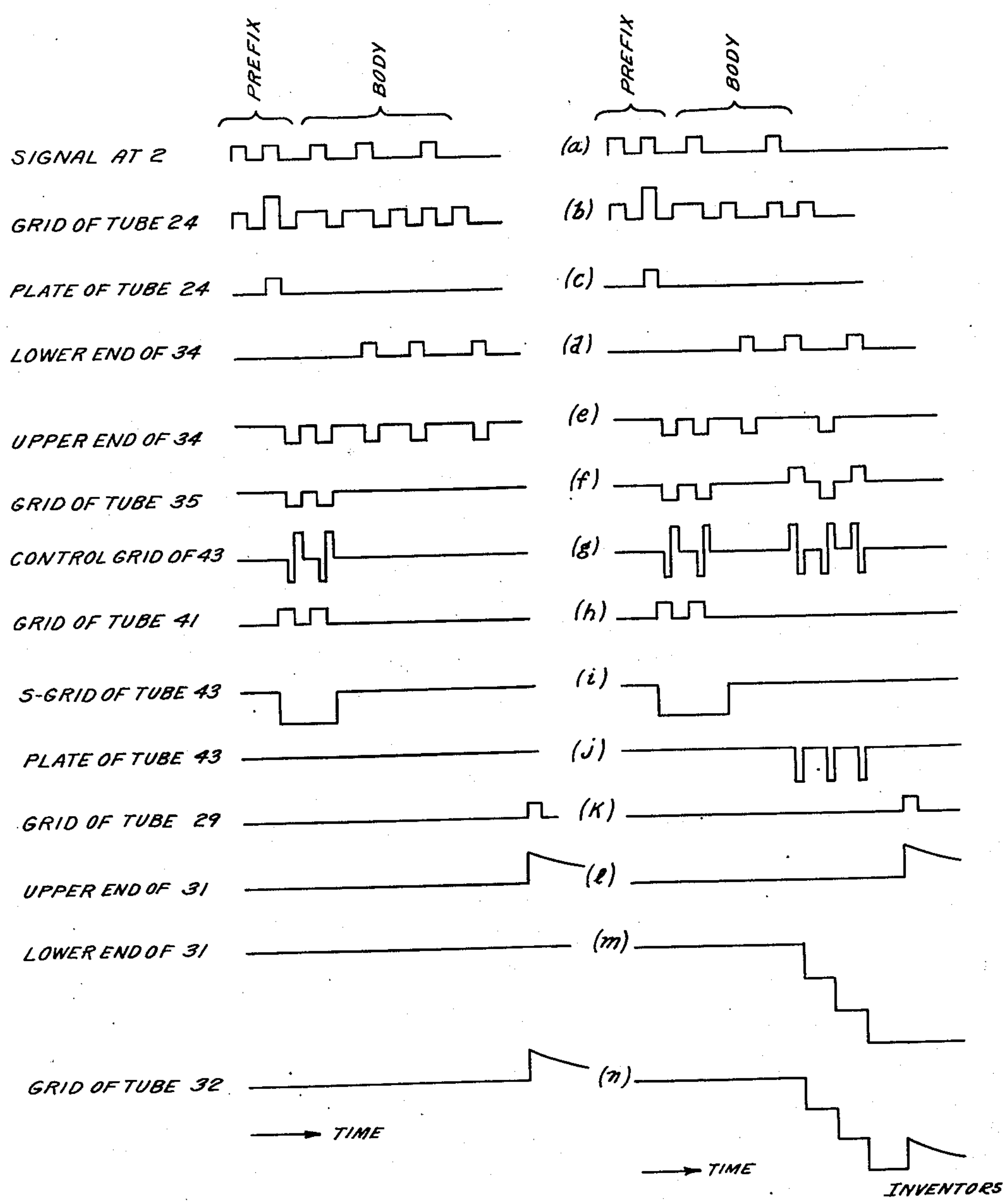

For the sake of a better understanding of the operation, Fig. 5a shows the shapes of signals and voltages at various points in one channel, in the case of which the input code is assigned to that channel shown, while Fig. 5*b* shows the shapes of signals and voltages in the case where the input code is assigned to a different channel. Each control signal received at 2 is made of a prefix portion, followed by an impulse train or a "body" portion carrying the control itself. The prefix, which is characteristic of the group of channels shown in Fig. 4, is itself made of a pair of spaced impulses having a spacing different from the interval between impulses (or impulse places) of the coded train or body portion. The prefixes for different groups of channels are distinguished by providing different intervals *t* between the two adjacent impulses. This arrangement is advantageous inasmuch as it provides an easy selection of the prefix. However, such characterization is in no way limitative and the prefix may, for instance, consist in a portion of the impulse train.

In the considered case, the complete control signal is supposed to have been submitted to a level limitation or clipping, according to any known process, so that control signals at input 1 of the remote selection equipment will be of unit level, arbitrarily chosen. The routing of the control signal is made at 2.

The prefix selecting circuit arrangement represented in blocks 11 and 3 may be as follows:

A cathode-follower transfer stage 21 applies the input impulses to an open delaying line 22, with a time of transit $t/2$. Said line 22 is connected to the plate of the triode element the load 23 of which is chosen equal to the characteristic impedance of the line. The impulses flowing in line 22 are thus reflected and come back to the line input after a time *t*. The result is that both prefix impulses will produce at the input of a second level detecting stage 24 (a threshold stage, adjusted for instance through cathode polarization) an impulse of a level equal to twice the unit level, while all the remaining impulses transmitted to this stage will have but the unit level, as predetermined by the level limitation prior to their application to the equipment. Thus, for any prefix, the interval *t* of which between pulses (it may as well be, in this case, a prefix consisting of one pulse of duration *t*) will be equal to the echo time of line 22, stage 24 will deliver to its load impedance 25 an impulse of unit level, while, for any other value of the interval or duration of the prefix, this stage will remain inactive. This does ensure the selection of the control signals according to the group of control channels they must reach. On the other hand, no impulse of a control signal proper (signal body) can be transmitted to the output of stage 24 because this stage does not respond to pulses of unit level.

Impedance 25 of this stage matches the characteristic impedance of a delaying artificial line 26 connected to the output of stage 24. Line 26 when energized by a pulse from stage 24 generates checking signals corresponding to the bodies of the control signals having prefixes like those which actuate stage 24, and, in addition, generates the common actuating signal. For such purpose, after a few initial sections 27 providing the delay necessitated by the introduction, in the other channel, of a line 37 to give again to the input impulses a shape similar to that of the locally generated code impulses, line 26 is provided with a number of taps spaced along its length so as to regenerate the body of the applied control signal. These taps are connected to the inputs of comparator input resistors 34 in various combinations according to the code assigned to each particular channel. This single arrangement thus may accomplish, at the same time, the functions for which the various generators 4 of Figs. 1–3 are provided. At the output of the delaying line 26 an impulse is transmitted to a circuit for generating the common actuating signal, such as the circuit shown at 3 in the preceding figures. In this case, circuit 3 includes an amplifying tube 29 the output of which supplies an integrator 30, of any known type, providing a time constant corresponding to the control time desired. (In Fig. 3 the tube 29 and integrator 30 are represented by block 14.) The actuating voltage thus generated is directed in multiple to one end of the input resistances 31 of each actuating electronic relay 32 of the control members which may be in the form of relays 33 the windings of which are inserted in the output circuits of said relays 32 (blocks 7, Figs. 1–3). Delay line 26 is terminated at its output end by its characteristic impedance 26*a*.

Each code or signal body generated in line 26 for checking purposes is directed to one end of a resistance 34 constituting the input of any comparator circuit (block 13, Fig. 3). Here, each comparator includes a driving stage 35, the output of which is fed to an integrator 36, the time constant of which is chosen longer than the duration of a complete impulse train (prefix excepted). The output voltage of said integrator 36 is applied on to the other end of resistor 31 of the actuating circuit. Thus, when the voltages from integrators 30 and 36 are simultaneously fed to said actuating member 7, no excitation of relay 33 will be produced. If, on the contrary, the output voltage of integrator 30 acts alone, relay 33 will be operated.

Thus, two signals or impulse trains are applied in opposition on to the input of each comparator; the first signal supplied from the local check code generator and generated in the mixing assembly corresponds to the individual signal body assigned to the actuating channel being considered, and the other signal being supplied from the input of the equipment through branch circuit 8, including circuit 12.

In this branch, to insure a re-shaping of the input train, it is necessary to insert a delaying line 37 with a suitable cutoff frequency, terminated on its characteristic impedance 38, and on which line input signals are applied at low impedance by means of a tube 39 in cathode-follower connection. The output of this delaying line, comprising a small number of sections, each with individual transit time $\theta$, is connected in multiple to the other end of each resistance 34 in which the input signal and the locally generated check code signal are opposed to each other. Thus, each comparator circuit receives, on the one hand, the input signal, and, on the other hand, the individual check signal which is applied to it from delay line 26.

When these signals are identical, at least the bodies of the signals are annuled at the grid of tube 35 (see Fig. 5*a*). It is possible to eliminate the prefix also in one of the following manners:

1. By generating said prefix by means of mixer connections in each individual check channel, whence it is suppressed by balancing in resistor 34.

2. By suppressing the prefix in branch 8, for instance by means of a circuit of the type in which suppression occurs through coincidence of impulses, the coincidence time of which is chosen equal to *t*, the interval between impulses or impulse duration corresponding to the prefix for the considered equipment.

3. As shown in Fig. 4, the prefix being suppressed after comparision by opposing the signal code bodies to each other in resistor 34.

To set this last process into effect, in line 26 after input section 27, an additional sampling mixer 40 is provided, said mixer being made of two or more taps covering an interval *t*. The impulses of this regenerated prefix are applied on to a flip-flop stage, or on to an amplifier-trimmer stage 41 which provides, at its output 42, an impulse of reverse polarity and of a duration at least equal to interval *t*. It is this impulse which, when applied to a grid of tube 43 forming the second stage of each comparator 13, blocks said tube and causes the suppression of the prefix (independently of the behaviour of this stage with reference to the control signal).

The operation of the illustrated circuit can be easily deduced from the preceding description and from Figs. 5*a* and 5*b*. Fig. 5*a* shows the voltage variations for a channel which responds to the body portion of the particular signal being received, and Fig. 5*b* shows the voltage variations at the same points in the same channel but for a different body signal. The input signals shown at (*a*) in both figures have the same prefix signal but different body portions.

For both signals, the prefix portion acting through line 22 produces a voltage pulse of double amplitude at the input of tube 24, see the second pulse in line (*b*), and tube 24 transmits a pulse of unit amplitude to delay line 26 which produces in channel I a series of pulses shown at (*d*) corresponding to the body portion of the received signal. These are applied to the lower end of comparator resistor 34. The pulses applied to the upper end of 34 through branch circuit 8, including delay line 37, are shown at (*e*). The body pulses are cancelled in 34 and the resulting pulse is applied to the grid of tube 35 as shown at (*f*), and the differentiated pulse is applied to the control grid of tube 43 shown at (*g*). At (*h*) is shown the regenerated prefix pulses applied from line 26 to the grid of stage 41 which produces a blocking pulse shown at (*i*) for application to the screen grid of tube 43. This prevents transmission of the prefix pulses through stage 35 through stage 43 to integrator 36, see (*j*). At (*k*) is shown the pulse applied to the input of tube 29 from the end of delay line 26, and the actuating pulse from integrator 30 supplied to the upper end of mixer 31 is shown at (*l*). Since the actuating pulse is unopposed, relay 33 in channel I will be operated.

In the case of a signal having a different body portion as shown at Fig. 5*b*, the signal applied to the upper end of mixer 34 will be different from that applied to the lower end, compare (*d*) and (*e*), and the resulting signal applied to the grid of tube 35 will be that at (*f*). The signal applied to the control grid of stage 43 is shown at (*g*) and the signal output of this stage is shown at (*j*). This signal is integrated at 36 and applied to the lower end of mixer resistance 31. The resulting signal applied to the grid of tube 32 is shown at (*n*), where the effect of the integrator 36 prevents operation of the tube 32 by the actuating signal shown at (*l*).

The operation of Fig. 4 may be further explained by reference to Figs. 5*c* and 5*d*.

The prefix which is common to the five relays or channels consists in a pair of impulses spaced by an interval *t*, which is shorter than the normal interval $\theta$ of a moment of the code of the control train of impulses entering at 1. In such an example, the incoming train therefore has four code moments, the first one of which is for the prefix, the three following ones serving for the definition, through presence or absence of impulses, of the numerical quantity, expressed in the binary system, which constitutes the body of the control signal.

Figure 5C:
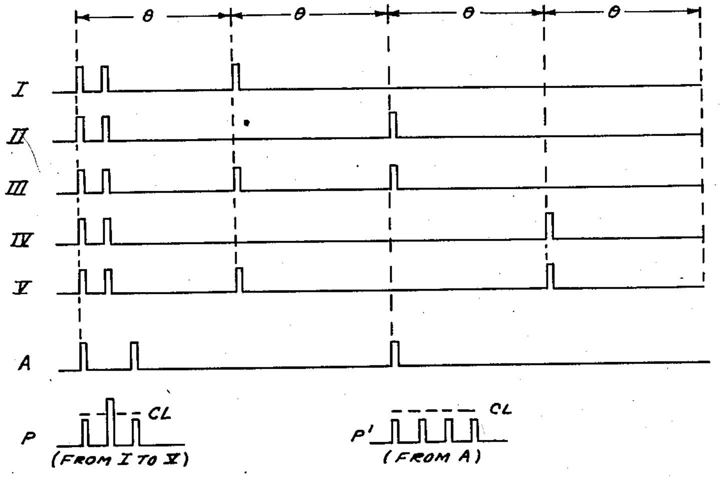
Figure 5D:
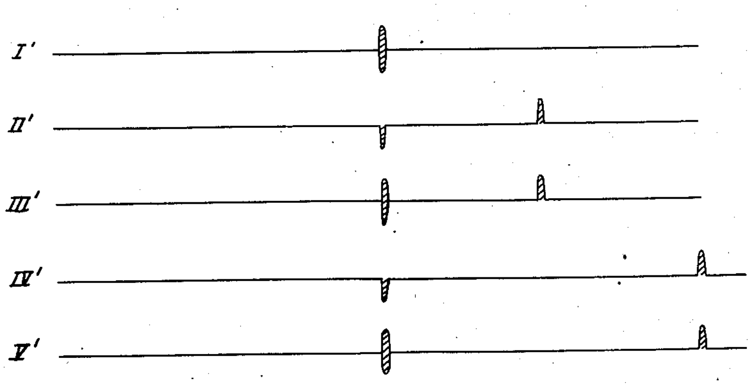
Figure 4:
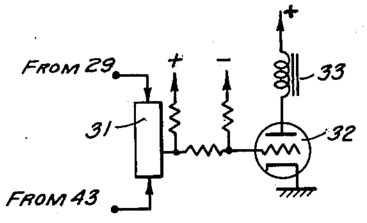
Figure 4:
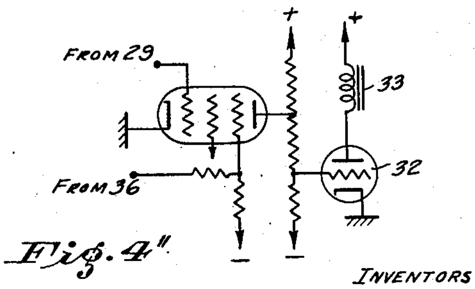

The possible configurations of the five control signals for this example appear in Fig. 5*c* from I to V. For these combinations, channels I, II and IV are controlled by the second, third and fourth taps on line 26. Channel III is controlled jointly from taps two and three, and channel V is controlled jointly from taps two and four (see the connections from line 26 to resistor 34 in each channel).

For the signal of order I, control circuit $7_{I}$ is energized; for the signal of order II, control circuit $7_{II}$, and so on up to signal of order V which controls circuit $7_{V}$.

For a control signal such as A, Fig. 5*c*, the prefix of which is constituted of two impulses spaced, for example by $2t$, none of the circuits 7 which are shown should be operative, regardless of the make-up of the body of the control signal.

The entering control signal is applied on the one hand to the prefix selector which contains the open delay line 22 having a time equal to $t/2$. The prefix signal of the spacing *t* shown at I to V will therefore apply on to the control grid of tube 24 a signal such as indicated at *p*, whereas the prefix signal of spacing $2t$, such as A, will provide a signal such as $p'$. The level of transmission of tube 24 being adjusted at CL (clipping level), the impulse which forms the local codes shall be transmitted by tube 24 to delaying line 26 only for the correct prefix.

This delaying line 26 has four sections $\theta$, plus one preliminary section 27 which compensates for the delay introduced into circuit 12 by delaying line 37. The object of delaying line 37 has already been explained.

Delaying line 26 is common to the various circuits which appear in Fig. 3 as blocks 14, $4_{I}$ . . . $4_{N}$. It is evident that as many delaying lines could be provided as there are blocks and this line is common for the sole purpose of reducing both the bulk and cost of the apparatus.

As the control impulse developed in 3 by stage 24 passes through line 26, the following are generated:

By mixer 40, the prefix;
By mixer $4_{I}$, the body of signal 100;
By mixer $4_{II}$, the body of signal 010;
By mixer $4_{III}$, the body of signal 110;
By mixer $4_{IV}$, the body of signal 001;
By mixer $4_{V}$, the body of signal 101, which represent all the bodies of signals which are susceptible of actuating electro-magnets 33 of circuits 7.

Signal I, code 100, is applied to the input of a comparator circuit $13_{I}$. Signal II, code 010, is applied to the input of a comparator circuit $13_{II}$. Signal III, code 110, is applied to the input of a comparator circuit $13_{III}$. Signal IV, code 001, is applied to the input of a comparator circuit $13_{IV}$. Signal V, code 101, is applied to the input of a comparator circuit $13_{V}$.

The other input taps of these comparators receive, each and all, the incoming control signal, including the prefix, through the output of transfer circuit 12 which includes delay line 37.

The prefix would therefore, in all these circuits 13, be transferred by tube 35 to tube 43 which which would transmit it to integrator 36 if said tube 43 was not blocked by a blocking signal derived from the prefix reconstituted in 40. Stage 41 applies a locking voltage on the suppressor grids of tubes 43, see the curves marked "S-grid of tube 43" in Figs. 5*a* and 5*b*.

The prefix which has been used for selecting all the devices to be actuated according to the code of the control signal and which has, through circuit 3, created a signal for regenerating the whole of the codes of the bodies of the control signals, is thus eliminated before the signal activates one of electromagnets of circuits 7.

The actuating signal or impulse which comes out of the end of line 26 is applied on to circuit 14 which, by means of integrator 30, supplies the control voltage of all circuits 7. The only circuit which is to operate is that one for which no voltage will be opposed to said control voltage.

This control voltage should therefore be supplied only after the comparators have operated, which explains the total delay provided in its development.

Let it be supposed that the entering signal is signal I, Fig. 5*c*. Comparator $13_I$ receiving the same body signal on both its inputs, its integrator 36 will develop no voltage and therefore no cancellation voltage will be opposed in 31 to the control voltage delivered by circuit 14; circuits $7_I$ therefore operates. On the contrary, on the other channels, (diagram II' to V', Fig. 5*d*), uncancelled impulses are transmitted to the integrators of these channels and, therefore, on each input of these circuits $7_{II}$ to $7_V$, a cancellation voltage is opposed to the control voltage issued from circuit 14, and electromagnets 33 of these circuits 7 will not be actuated.

The arrangements of Figs. 1 and 2 may be constructed in the same manner as Fig. 4 by omitting integrator 30, and the circuit element 6 would be formed of a gate of known form, such as shown in Fig. 4' or in Fig. 4''.

What we claim is:

1. In a selective signaling system the combination of a group of control members each having normally unenergized control circuits and each having a distinctive control signal assigned thereto, a checking signal generator for each control member for generating a checking signal corresponding to the assigned signal of said control member, said control signals each having a prefix portion which is the same for all of said control members and a body portion which is individual to a particular control member, means responsive to said common prefix portion of a received control signal for generating an actuating signal, connections including delay means for applying said actuating signal to all said control circuits in said group after a certain time delay and in a direction tending to energize said control circuits, connections for simultaneously energizing all of said checking signal generators by said actuating signal, a signal comparator for each control member, each having input and output circuits, connections for supplying the received control signal in common to the input circuits of all said comparators, connections for supplying the respective checking signals to the inputs of their corresponding comparators for comparison therein with said commonly supplied received control signal so that the output circuit of the comparator receiving a checking signal like the received control signal yields a null voltage and the output circuits of all other comparators yield a comparison voltage, and means extending between the output circuits of the respective comparators and the control circuits of their corresponding control members for supplying the comparison voltages in a direction to oppose said energizing tendency of said delayed actuating signals in said control circuits, whereby said delayed actuating signal energizes only the control circuit of the control member to which said received control signal is assigned.

2. A selective signaling system according to claim 1, and including a second group of control members having individual control signals assigned thereto, the prefix portions of the signals of said second group being identical and differing from the prefix portions of the signals assigned to said first group, each control member of said second group having a control channel connected to the same transmission line as the members of said first group, and each channel being identical with the corresponding channel in the first group except that the actuating-signal-generating means of the second group responds only to the prefix portion of the signals for the second group.

3. A selective signaling system according to claim 2, wherein a single set of checking signal generators supplies checking signals to the control channels in both of said groups.

4. A selective signaling system according to claim 1, and including means for eliminating the prefix portion from the received control signal before it is supplied to said comparators.

5. A signaling system according to claim 1 wherein said checking signal generators produce only the body portion of the signal assigned to the respective control members, and including means connected ahead of said comparators for eliminating the prefix portion of the received signal before the received signal is applied to said comparators.

6. A signaling system according to claim 1 wherein said checking signal generators supply to said comparators only the body portion of the signals assigned to the respective control members whereas the entire received signal is applied to said comparators, and including means connected in the output of each comparator for eliminating the comparison voltage caused by the prefix of the received signal.

7. In a selective signaling system the combination of a group of control members each having normally unenergized control circuits and each having a distinctive control signal assigned thereto, a checking signal generator for each control member for generating a checking signal corresponding to the assigned control signal of said control member, means responsive to a received control signal assigned to any of said members for generating an actuating signal, connections including delay means for applying said actuating signal to all said control circuits in said group after a certain time delay and in a direction tending to energize said control circuits, connections for simultaneously energizing all of said checking signal generators by said actuating signal, a signal comparator for each control member, each having input and output circuits, connections for supplying the received control signal in common to the input circuits of all said comparators, connections for supplying the respective checking signals to the inputs of their corresponding comparators for comparison therein with said commonly supplied received control signal so that the output circuit of the camparator receiving a checking signal like the received control signal yields a null voltage, and the output circuits of all other comparators yield a comparison voltage, and means extending between the output circuits of the respective comparators and the control circuits of their corresponding control members for supplying the comparison voltages in a direction to oppose said energizing tendency of said delayed actuating signals in said control circuits, whereby said delayed actuating signal energizes only the control circuit of the control member to which said received control signal is assigned.

8. A signaling system according to claim 7 wherein said actuating-signal-generating means produces a single pulse in response to each received signal, and each of said checking signal generators comprises a delay line having its input end connected to said actuating-signal-generating means, said checking signals being derived from said delay line by tap connections from a mixing circuit to spaced points along said delay line.

9. A signalling system according to claim 2 wherein said delayed actuating signal is derived from said delay line through a connection to said line near the output end thereof.

FRANÇOIS HENRI RAYMOND.
GÉRARD JEAN RENÉ PIEL.

References Cited in the file of this patent

UNITED STATES PATENTS

| Number | Name | Date |
|---|---|---|
| 2,497,936 | Finch | Feb. 21, 1950 |
| 2,522,609 | Gloess | Sept. 19, 1950 |